United States Patent [19]
Moore

[11] 3,948,317

[45] Apr. 6, 1976

[54] STRUCTURAL REINFORCED GLASS-CERAMIC MATRIX PRODUCTS AND METHOD

[75] Inventor: Gary Lee Moore, Swanton, Ohio

[73] Assignee: Owens-Illinois, Inc., Toledo, Ohio

[22] Filed: Jan. 16, 1974

[21] Appl. No.: 433,737

Related U.S. Application Data

[62] Division of Ser. No. 333,380, Feb. 16, 1973, Pat. No. 3,885,942.

[52] U.S. Cl. .............. 165/165; 165/10; 65/DIG. 7; 65/33
[51] Int. Cl.² .......................................... F28F 3/00
[58] Field of Search ..................... 165/10, 165, 166; 65/DIG. 7, 33

[56] References Cited
UNITED STATES PATENTS

| | | | |
|---|---|---|---|
| 2,821,369 | 1/1958 | Hilliard | 165/165 X |
| 2,887,303 | 5/1959 | Reys | 165/165 X |
| 2,887,304 | 5/1959 | Hilliard | 165/165 |
| 3,112,184 | 11/1963 | Hollenbach | 165/10 X |
| 3,482,622 | 12/1969 | Bracken, Jr. et al. | 165/10 X |
| 3,641,763 | 2/1972 | Cole | 165/10 X |
| 3,771,592 | 11/1973 | Sayers | 165/10 |
| 3,780,792 | 12/1973 | Ritchie | 165/10 X |

Primary Examiner—Albert W. Davis, Jr.
Attorney, Agent, or Firm—J. R. Nelson

[57] ABSTRACT

This invention discloses structural reinforcements for glass-ceramic matrix products, such as in heat exchanger matrices of the regenerator and recuperator types. In such matrices, a structural improvement is provided as follows: (1) In a regenerator wheel having parallel, open air passages through it, certain passages in areas of the periphery or hub are filled with a finely divided material, such as a ceramic or frit of the composition of the matrix. The composite of the matrix and fill material therein is heat treated or cured to unite the matrix and the material. This filling or "stuffing" converts the honeycombed matrix region to a structurally reinforced portion of the device. (2) In a recuperator wherein passageways of the matrix are either parallel (counterflow) or angularly disposed (crossflow), certain areas of the matrix are filled with such finely divided material and heat treated or cured to form structurally reinforced regions and define or contain air flow or provide for headering and attachment of headering ducts. The heat treat conditions are variable depending upon the stuffing material and matrix fabrication.

2 Claims, 10 Drawing Figures

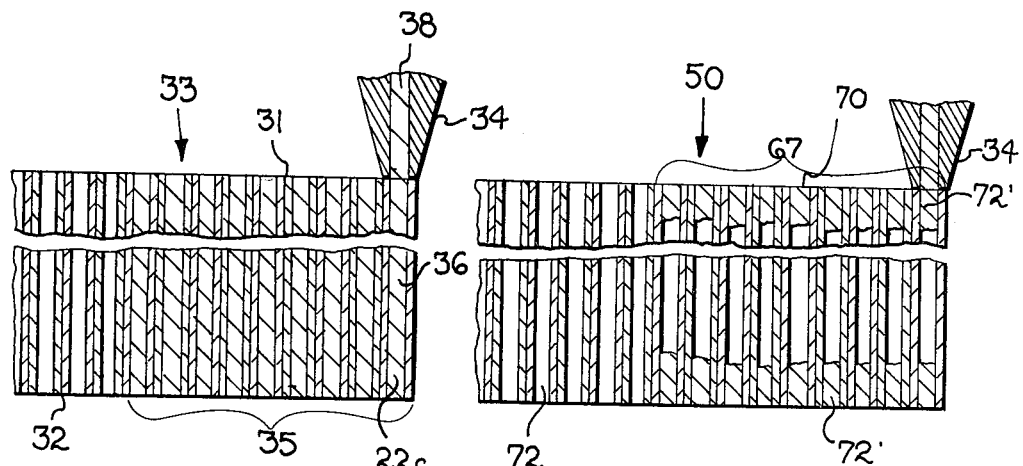
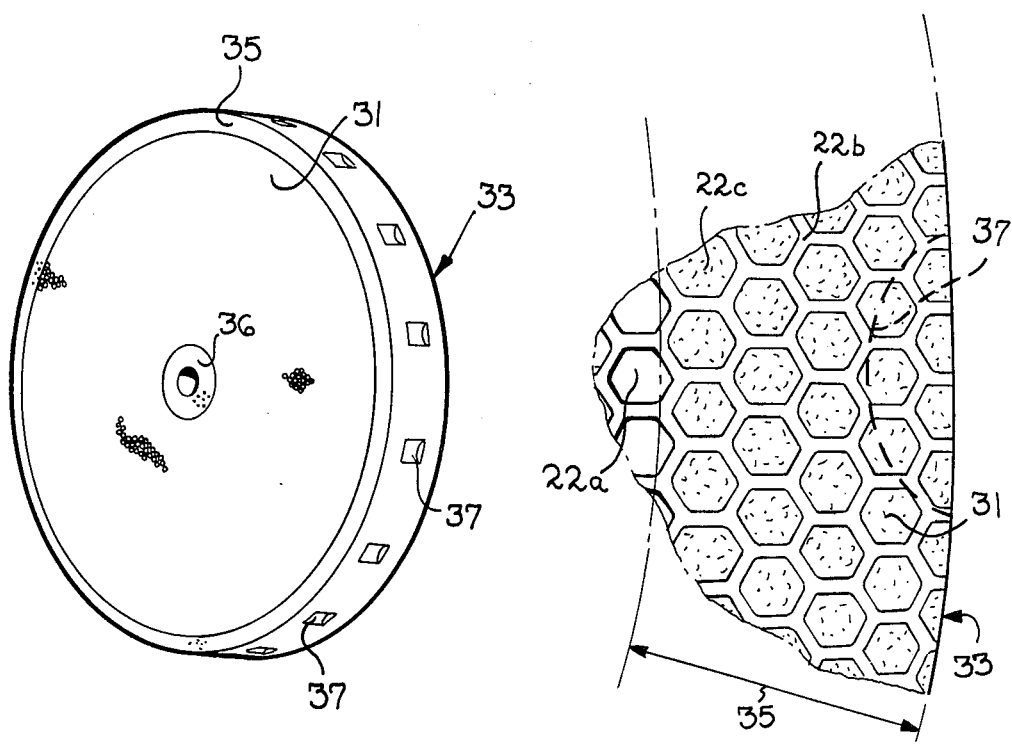

STRUCTURAL REINFORCED GLASS-CERAMIC MATRIX PRODUCTS AND METHOD

This is a division of application Ser. No. 333,380, filed Feb. 16, 1973 now U.S. Pat. No. 3,885,942.

The present invention relates to glass-ceramic products in which honeycombed matrix is structurally reinforced to provide added strength thereto or provide a structural member in the device for the function thereof.

The glass-ceramic matrix of the type contemplated is disclosed in an earlier application of Y. K. Pei, Ser. No. 421,564, filed Dec. 4, 1973 which is a continuation of Ser. No. 30,859, filed Apr. 22, 1970, and owned by the assignee of this application. Another form of glass-ceramic matrix known in the art is disclosed in U.S. Pat. No. 3,112,184. These matrix products of glass-ceramic are designed for use in heat exchangers, such as regenerators for gas turbine engines and, as is hereinafter illustrated, for recuperators.

In the gas turbine regenerator, the matrix is composed of a porous or honeycomb structure shaped as a wheel. The passageways through the matrix run parallel to each other from one radial face to the opposite radial face of the wheel. A central hub portion is included to support the wheel on a shaft for rotation. The periphery of the wheel, in some cases, is equipped with machined plural spaced recesses in the structure for spring mounting the driving ring gear to rotate the wheel about its central axis. The active matrix (parallel passageway) portion of the wheel is, therefore, generally torroidal. An example of such a device is disclosed in British patent 1,146,228 of Ford Motor Company Limited dated Mar. 19, 1969. This patent discusses the problem of mounting the annular drive gear and glass-ceramic solid ring on the periphery of the regenerator wheel. British patent 1,100,355 to Williams Research Corporation dated Jan. 24, 1968 discusses the problems of making shaft-tub coupling on a regenerator wheel. Both patents involve the use of glass-ceramic matrix products. The regenerator wheel of this type (automotive gas turbine) consists of a wheel structure with central axis and a solid ceramic peripheral rim with the matrix disposed between the center hub and rim. The wheel is driven through a metal ring gear fastened on the outer periphery of the solid ceramic rim. The three parts, ring gear, rim and matrix operate in an environment in which alternating hot and cold conditions occur. Since some differential of expansion does occur between the three parts, there is certain difficulty in constructing and operating the regenerator to avoid structural failure. Construction of the hub of the wheel involves a generally similar problem in that the hub structure is a solid ceramic or glass-ceramic part surrounded by the matrix.

In the construction of a recuperator of glass-ceramic matrix, the flow-through passages for the different gases must be connected to ducts and headers. For instance, within the matrix, certain regions of the flow through passages must be isolated or divided from adjacent regions. At the operating face of the recuperator matrix, solid members must be attached to effect the particular gas flow in a given direction through the unit. In attaching the ducts thereat, a structural element must be affixed to the matrix which should be strengthened in these areas for attaching the fixtures and ducts to the recuperator matrix and provide an operating recuperator that will avoid structural failure.

It is an important object of the present invention to provide one or more structural elements of the regenerator to overcome the differential expansion problem. The matrix areas in contact with the driving parts of the regenerator are strengthened.

It is an important object of the invention to provide a matrix strengthened at selected regions enabling operation of the unit with other parts having dissimilar expansion; these parts being for either driving the unit, as in the case of a rotary regenerator, or for connecting the flow of gases operating in the unit, as in the case of a recuperator, or for resisting wear and offering structural durability to the matrix product on certain regions in contact with elements outside the matrix.

Another object of the invention is to provide a reinforced structural region on the recuperator matrix for the attachment of fixtures needed to operate the recuperator.

Another object of the invention is to provide means in the matrix of the recuperator for isolating or regulating the path of flow of a gas internally of the matrix.

A further object of the invention is to provide structural reinforcement of a glass-ceramic matrix unit by introducing in the passageways of selected portions a slurry of a finely divided frit powder composition of a similar composition to the matrix and through heat treatment form the matrix and frit powder into a monolithic mass.

Yet another object of the invention is a method of making the structurally reinforced matrix products herein more specifically described.

Other objects, features and advantages will be more apparent from the following description of the invention in conjunction with the appended drawings, on which:

FIG. 4 is a sectional horizontal view, partly schematic along line 4—4 on FIG. 6, showing the first embodiment of the method of the invention wherein passages of select portions of the matrix product are being filled completely with a frit composition in slurry form;

FIG. 5 is a sectional horizontal view, similar to FIG. 4, showing a second embodiment of the method of the invention, wherein the passages of select portions of the matrix product are partially filled by introducing the frit slurry from each face of the matrix product thereat;

FIG. 6 is a perspective view of a final regenerator matrix wheel ready for the installation of peripheral ring drive gear and mounting shaft and structurally reinforced in accordance with the invention;

FIG. 7 is an enlarged, fragmentary view of one end face portion near the periphery of the regenerator wheel product of FIG. 6;

DESCRIPTION OF THE PREFERRED EMBODIMENTS

Figure 1:
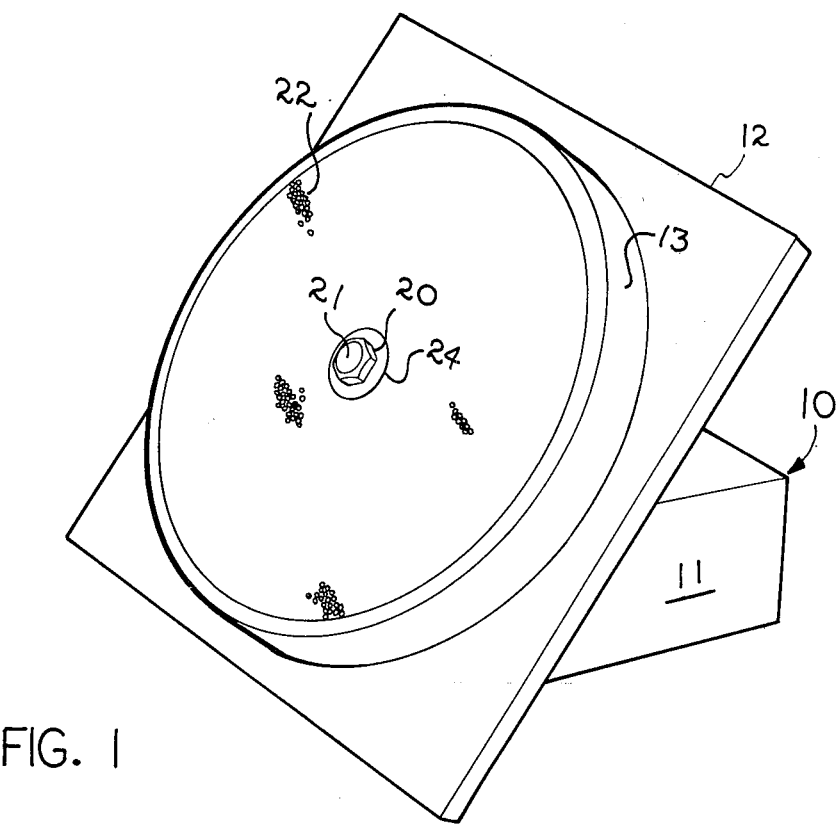
FIG. 1 is a perspective view of a jig assembly utilized in making the regenerator embodiment of the invention and showing the packing of the tubes, at least partially, within the structure mounted on the assembly.

As shown on the drawings, FIG. 1, reference numeral 10 refers generally to an apparatus which is substantially similar to that apparatus illustrated in FIG. 1 of the above-identified application of Y. K. Pei, Ser. No. 30,859 (now a continuation application Ser. No. 421,564).

As illustrated in FIG. 1, a ceramic ring 13 is mounted on a jig comprising a face board 12 attached to a vibrator means 11. Clamp means (not shown) are disposed on the face board 12 and removably secure the ring 13 thereon.

A hub or bearing 20 may also be removably mounted on the face board 12 and held at the center axis of the ring fixture 13. Fastener means 21 passing through the hub 20 is secured to the face of the board to locate and maintain it in proper position in the assembly. A plurality of hollow, thin-walled thermally crystallizable glass tubes 22, closed or sealed at the opposite ends 22', are next closely packed together in ring 13 in a parallel relationship, as illustrated partly on FIG. 1. During loading of the tubes, a slurry of frit powder that is crystallizable is interspersed in the spaces between the adjacent exterior wall surfaces of tubes 22. These spaces are herein referred to as the interstices, such as occur in the assembly of the tubes on FIG. 1.

Figure 3:
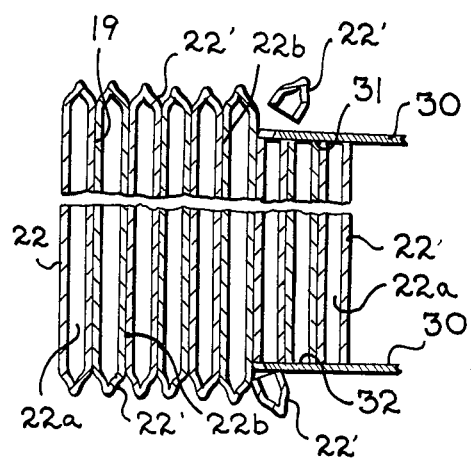
FIG. 3 is an enlarged plan view of a portion of one end face of the matrix product.

As may be more readily appreciated from FIG. 3, the tubes 22 sealed at their ends 22', trap air or other thermally expansible fluid medium therein. The tubes are presealed in manufacture prior to their assembly on the fixture of FIG. 1.

In the matrix product of this embodiment, tubes 22 have a small outer diameter, on the order of 0.03 inches and wall thickness of about 0.001–0.003 inches. The intersticial filling between tubes 22 in the assembly (FIG. 3) is accomplished with a composition and in a manner described in the U.S. application of Marion I. Gray, Jr., Ser. No. 169,216, filed Aug. 5, 1971 (now U.S. Pat. No. 3,773,484), and owned by the assignee of the present application. To achieve compactness in the array of tubes on the fixture of FIG. 1, the jig is provided with a vibrator 11 which, in turn, causes face board 12 and ring 13 to vibrate. It is desirable that each tube is in contact with approximately six other surrounding tubes.

In the manner described in the Gray application, the assembly of the ring 13, hub 20 and closely packed tubes 22 is removed and placed between two flat refractory plates each of substantial mass. The sandwich of the plates and matrix assembly therebetween are transferred to a heat treat kiln or furnace for the first stage heat treatment explained more in detail hereinafter. In the first heat treatment, the furnace is maintained sufficiently to soften the glass walls of tubes 22 and cause the gas inside the tubes to expand. This action is referred to as "bloating" the tubes, the result being the adjacent tube walls fuse together with the next adjacent glassy surfaces into form of a unitary or integral matrix. The sectional illustration of FIG. 3 is such a matrix. The intersticial frit composition will also fuse into the wall structure of the tube walls and increase the density of the resulting matrix solids. The first heat treatment cycle causes nucleation and crystallization to take place in the crystallizable composition, converting the glass to a glass-ceramic.

Figure 2:
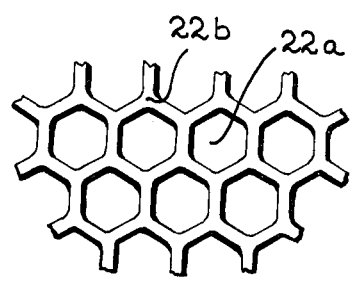
FIG. 2 is an enlarged side view in section of the assembled tubes after they are initially heat treated and "bloated," the sealed ends of the tubes being removed from the opposite faces of the matrix to form an open matrix product.

After the assembly is allowed to cool, the face surfaces are machined. This step is illustrated on FIGS. 2 and 3. The machining is accomplished by sawing the opposite ends 22' of tubes 22 by a saw blade 30, schematically illustrated on FIG. 3, such that the opposite radial or end faces of the matrix assembly 31 and 32 are substantially parallel planes. The matrix radial face, for example 31, will appear as shown on the partial top view of FIG. 2. Thus, after machining, the central passages 22a of the tubes 22 are open at the opposite radial end faces 31 and 32 of the wheel matrix. During the first heat treatment process, the temperature of the glass of the tubes of the matrix is increased to above the softening point of the composition, described more in detail hereinafter in the Examples. The pressure created by the expansion of the gas media entrapped in the central passages of the tubes reworks the glass into the matrix as shown in an end view, FIG. 2. The central passages of the tubes were originally substantially cylindrical and with the expansion of the entrapped gaseous media, the walls of the tubes 2 are reworked into the matrix of a substantially solid wall structure 22b of glass and frit coating composition to form the irregular cross-sectional passages 22a of the matrix. These irregular sectioned passages are shown on the drawings, FIG. 2, as being generally hexagonal in section.

After the matrix assembly is sawed to form the opposite parallel end faces 31 and 32, the regenerator matrix product 33 appears in a contour substantially as shown on FIG. 6. This product is next treated in accordance with one of the embodiments of the invention.

FIRST EMBODIMENT — REGENERATOR

As shown on FIG. 4, the regenerator 33 is preferrably supported in horizontal position with the hub axis vertical. A pressurized gun mechanism 34, such as used in a pressurized paint supply system, is connected to a source of slurry composition, hereinafter described. The preselected areas of the wheel 33 that are to be structurally processed are made accessible at one radial face, such as at 31, to the gun 34. The end openings of passages 22a at the one face, such as 31, may be regionally masked off by suitable known means and technique. This regional masking step is optional, depending upon the degree of accuracy needed in filling and reinforcing the selected areas of matrix.

The gun 34 injects a stream of slurry 38 of the frit powder composition into the selected passages 22a under some pressure. This is similar to a caulking operation. The slurry is added until the selected passages 22a are filled and extend through their opposite ends. Excesses that appear at the lower face 32 of the regenerator 33 or be built up on the upper face 31 should be removed in any suitable manner, such as by a doctor blade (not shown) striking the respective surfaces smooth or even. The slurry is forced all the way through the individual tubes of the treated regions on the matrix product.

The product containing the filled tubes is dried in air or in a moderate oven at temperature of about 160°F for from 4 to 8 hours. The strengthened product is then ready for the second heat treatment cycle wherein the compositions are crystallized to a monolithic glass-ceramic product of the increased strength and structural properties.

In the example given, the reinforced regions of the regenerator 33 appear in the peripheral ring-like region 35 of the matrix (FIG. 6) and in the central annulus region 36 for the hub of the wheel.

As shown on FIG. 6, the scalloped areas 37 are formed on the radial peripheral face of the wheel which is formed after the annulus region 35 is finally crystallized to a monolithic structure in the matrix. Scallops 37 are disked, concave areas substantial semi-cylindrical in shape which are provided to receive spring-type members for mounting the driving ring gear (not shown) on the regenerator. The areas 37 are spaced uniformly around the outer periphery of the wheel and formed by a machining operation, such as by grinding. The product as shown on FIG. 6 represents a ceramic type regenerator that is ready for assembly in the gas turbine engine.

After the several passages are filled and the slurry composition dried, as indicated at 22c on FIG. 4, the product 33 is ready for the second heat treatment. The technique just described in preparing the ring region 35 of regenerator 33 is also employed similarly and comparably in filling the passages of the region at the hub 36 of the regenerator.

The regenerator with regions 35 and 36 thereon filled with the slurry composition and dried is now transferred to a heat treat furnace or kiln. The heat treat cycles and examples of composition of the glass tubes and slurry of frit composition will be hereinafter more particularly described.

SECOND EMBODIMENT — RECUPERATOR

Figure 8:
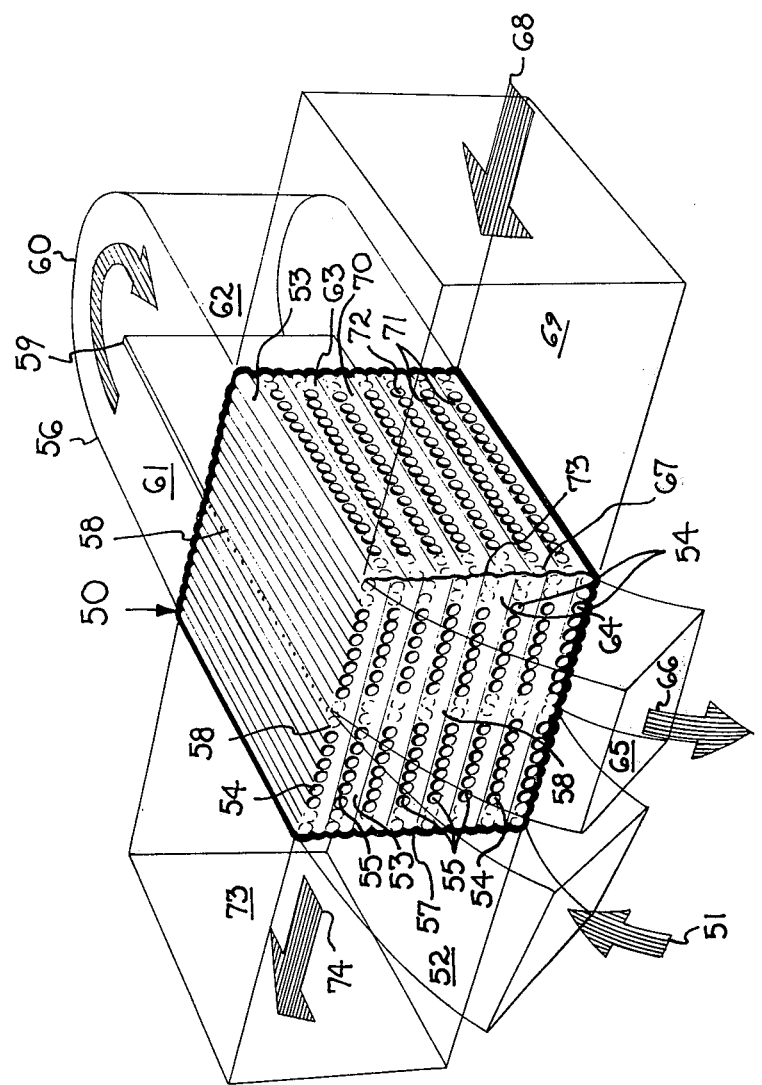
FIG. 8 is a perspective, somewhat schematic view of the recuperator embodiment of the invention and illustrating the structurally reinforced matrix product thereof.

As shown on FIG. 8, a glass-ceramic recuperator is indicated generally by reference numeral 50. This is an exemplary form of a recuperator type, heat exchanger. It is a stationary structure which exchanges heat by flow of two different gaseous media through the structure. The illustrated recuperator 50 is a particular cross-flow variety. Hot gases are conducted from a source at arrow 51 into an inlet duct 52 (phantom outline) attached to a left-hand header section at the front face 53 of recuperator 50. The left-hand section consists of a matrix product having longitudinal passages 54 disposed in alternating, vertically-spaced rows 55 which connect inlet duct 52 to a reversing duct 56. The reversing duct 56 has a header connection with the left-hand face of the recuperator opposite the face 53.

The left-hand section of the recuperator includes the vertical corner region 57 constructed in accordance with the invention. This construction will be presently described with reference to FIG. 9. A center region 58 of the matrix extends along the inside perimeter of the left-hand section at face 53 and coextensive with the length of the passages 54. Attached firmly to the opposite face at the opposite end of the center region 58 of the recuperator is a solid baffle wall 59. The baffle 59, which is optional, forms a common interior wall for reversing duct 56 and may be employed to reduce turbulence. An outer wall 60 (phantom outline) is sealingly attached to one end to the back vertical corner region (not shown) of the opposite face on the recuperator and is curved at its outer end and together with interior wall 59 forms the left-hand outlet duct 61 connected by the curved reversing bend, at the arrow on FIG. 8, to the inlet duct 62 similarly connected to the opposite face of the right-hand section of recuperator matrix at the right, back corner region 63. The reversing duct 56 includes top and bottom walls to provide an enclosed path for flow of gas exiting from the left-hand section and entering the right-hand section of the recuperator. The hot gas entering as at arrow 51 is conducted through the several passages 54 of the left-hand section of the recuperator, through duct 61 and duct 62 back into the passages 54 in the vertically spaced tiers of the right-hand section of the recuperator, exiting at face 64 thereof into the exhaust duct 65. The exhaust flow of the gas is indicated by arrow 65 on FIG. 8. Duct 65 (phantom outline) is sealingly connected to the perimeter of face 64 of the right-hand section of the recuperator between the solid center region 58 and right vertical corner region 67. All four vertical corner regions of the recuperator such as 57, 63, 67, are similarly constructed, as will be presently described.

During the flow of the hot gases through the passages 54, extending front-to-back on recuperator 50 in alternating rows, heat is exchanged through the interior wall of the matrix to a colder gas. The cold gas is introduced at one side of the recuperator, as indicated by arrow 68 at the right-hand side of FIG. 8. The cold gas is connected by cold inlet duct 69 (phantom outline) sealingly attached onto the right side face 70 of the recuperator. Alternating rows 71 of passages 72 extend from right-to-left on FIG. 8, and passages 72 are open at the left side face (not shown). The heat is exchanged from the hot gas flowing through the recuperator in its passages 54 (front-to-back and reversing back-to-front on FIG. 8) to the cold gas flowing through passages 72 from right to left. The heated gas is conducted by the exhaust duct 73 in the direction of arrow 74 into a device, such as an engine. The ducts 69 and 73 are connected onto the specially constructed vertical corner regions of the matrix product constructed according to the invention.

The recuperator 50, described in conjunction with FIG. 8, is a two-pass, cross-flow recuperator. There are several other known types of recuperators to which the invention shall apply equally well, for example a cross-flow recuperator.

Figure 9:
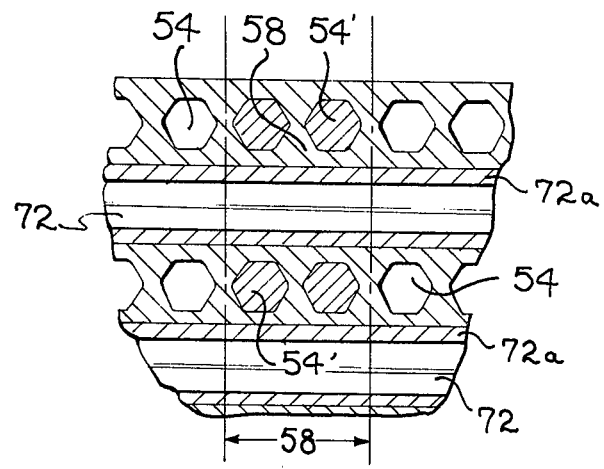
FIG. 9 is a fragmentary sectional elevational view taken along line 9—9 on FIG. 8.
Figure 10:
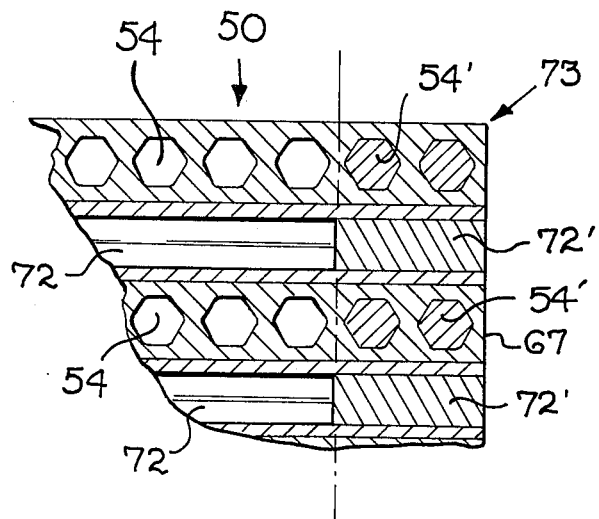
FIG. 10 is a fragmentary sectional elevational view taken along line 10—10 on FIG. 8.

Referring also to FIGS. 9 and 10, the construction of the recuperator will now be described. In making up the matrix of the recuperator, glass tubes of a composition given in Table II and that are closed at the opposite ends (similar to the tubes 22 shown used in the FIG. 1 embodiment) are laid parallel in adjacent, wall-to-wall contact in a common plane. The tubes are substantially of the same length. The diameter-to-wall thickness ratio and size is within the examples given herein. The width of this array of tubes will conform to the width of one tier of tubes, such as 55 and 71 of recuperator 50. The tier of tubes is held together by spraying over them a layer of plastic adhesive which will dry to a cohesive plastic film holding the tubes together as a layer or sheet-like array. The plastic adhesive may be an air-setting, bonding composition, such as a polyurethane or other composition which will be readily understood by those skilled in the art for accomplishing this purpose. These sheets are laid one over the other, each successive sheet having its tubes extend in a direction that is at a right angle to the tubes in the adjacent sheet thereof. Between super-positioning each succeeding layer of the tubes, the upper surfaces of the topmost layer is covered with a frit powder slurry of a composition selected from Table I herein. The frit powder may be on the order of −200 mesh and included in a slurry that is on the order of a 2.5 to 1 ratio of powder to vehicle. The slurry of the frit applied to the top surface of the layer of tubes is sufficient to fill the void spaces that would otherwise result upon placement of the next tier or layer of tubes disposed 90° to them. Subsequently, the slurry of frit powder is dried ready for the first heat treatment cycle.

As was the case in the regenerator embodiment herein described, the laid up tiers of tubes of the recuperator assembly are then firmly confined in a vented mold (not shown) restraining the structure on each of the six sides to essentially confine the volume of the assembly. The matrix and mold are then placed in a heat treating oven or kiln and the temperature is raised to at least the softening point of the glass and frit compositions. The entrapped gas media inside the several sealed tubes expands and as the glass softens, the adjacent walls of the tubes and frit powder in the intersticial spaces fuse to form a monolithic glass matrix. This heat treatment constitutes the "bloating" step of the method. The heating of the matrix causes the plastic adhesive used in bonding the tube layers into sheet-like form to volatilize and be driven off; thus, the need arises for venting of the confining mold fixture for the assembly. Also, the vehicle for the slurry of frit powder is partially volatilized and driven off in this first heat treatment.

Upon completion of the first heat treatment wherein bloating occurs in forming the matrix of the closed tubes, the assembly is cooled to suitable handling temperature, normally ambient temperature.

As an alternative within the spirit of the invention, the assembly heat treated in this first heat treatment provides a fused, crystallized structure of the sealed tubes in the form of a glass-ceramic. The machining of the four faces of the recuperator is the next step. The preferred form of the invention is therefore to perform the bloating step at the first heat treatment and bring the glass matrix to a stabilized glass-ceramic after the subsequent processing, yet to be described, is accomplished.

After the mold fixture is removed from the matrix assembly and the product cooled, the sealed ends of the tubes are cut or ground away to open each opposite end of the tubes to the atmosphere. The opening of the tube ends is referred to as the machining step in which the four side faces of the matrix assembly are cut with a diamond abrasive saw to form the flat faces, similar to that shown on FIG. 8 at reference numerals 53 and 70 and their opposite counterpart faces (not shown). The machining forms the alternating rows or tiers, such as 55, on each face of the regenerator leaving the open through passages 54 and 72. The four vertical corner regions of the recuperator are each formed in accordance with the description of the front right-hand vertical corner region 67, as follows:

Referring to FIG. 5, the machined face 70 of the recuperator 50 is accessible at the tiers of passages 72 facing the pressure gun device 34. The slurry composition of finely divided frit powder selected from Table I, Example I, herein, is forced into several of the passages 72 to partially fill them as at 72' with the slurry. The several passages 72 are selected beginning at the frontal corner 73 or vertical edge of the facing 70 and extending inwardly a desired distance along the tier 71 of openings to fill a preselected number of passages 72 to correspond with the selected width of the corner region 67 that is to be reinforced (FIG. 8). In the sectional view on FIG. 5, the penetration of the slurry into the passages 72' may be to a desired depth and controlled relatively uniformly by a measurement of material injected from gun 34 or by a factor of time at a given pressure output of the gun. The partial fill of passages 72' may be desirable in the interest of saving material of the slurry compound for a given reinforcement factor of the matrix.

If a partial fill is desired, after the several tiers or rows of passages 72' are treated from the one face, i.e., 70 and 53, of the recuperator 50, the unit is reversed in position and the slurry compound of finely divided frit powder is inserted to the desired depth into the same passages 72' from the oppose face of the recuperator block. This appears at the lower end of FIG. 5 such that the corner region 67 and its opposite end surface are similarly partially filled with frit powder slurry compound.

The same option of treatments may be repeated for the other corner regions, such as at region 63. The top and bottom tiers 53 along the upper and lower margins, respectively, of face 70 consist of longitudinal walls of the tubes of the matrix. Accordingly, the face 70 of the recuperator is marginally framed with a structural band-like region whereat the duct 69 is sealingly connected onto the recuperator 50. Likewise, the other three faces of the recuperator are marginally structured.

The vertical corner regions are illustrated in cross-section on FIG. 10. The several passages 54' extending front-to-back on FIG. 8 are filled with the composition, in this case part of the way along their length from the opposite ends. The cross passages 72, extending from left-to-right on FIG. 8 are similarly partially filled. The front vertical corner region adjacent vertical corner 73 is thus reinforced to a depth of plural passages 54'.

As an alternative in the making of reinforcement regions of the matrix at the vertical corners thereof, the slurry composition may be introduced by the gun 34 to completely fill the several passages throughout their length. In such treatment, filling of the passages of the alternate tiers or rows of passages may be accomplished from one face of the unit without need of application into these passages from the reverse face.

Lastly, in processing the recuperator 50 for reinforcement regions, the central divider section 58 of the FIG. 8 embodiment is constructed by applying slurry composition into the open passages near the center region 58 on face 53 of the matrix in the alternate tiers or rows 55. The same options are available, as described above for filling the vertical corner regions on the matrix product; i.e., (1) the slurry may be filled into each of the opposite ends of the various passages in the region 58 to partially fill them at their opposite ends, or (2) the passages thereat may be filled completely from end-to-end for making a substantially solid central dividing wall in the matrix. This latter approach is preferred in a recuperator of the type illustrated on FIG. 8 to avoid the chance for internal cross leakage in non-filled sections.

The center region 58 of the matrix will appear as shown in the sectional view on FIG. 9. The several central passages 54' selected to receive the slurry of frit composition extend from front-to-back on the matrix of FIG. 8. The walls 72a of the cross passages 72 combine with the filled passages 54' to provide a central wall dividing the left-hand front section of the recuperator from its right-hand front section and separates the gas flow input 51 from the gas exhaust 66 in the recuperator body. The heat of the gas in passages 54 is exchanged through the matrix wall 72a with the cool gas flowing in passages 72 of the adjacent tiers 55.

After the various passages (tubes) of the matrix of recuperator 50 are filled, as disclosed, the slurry composition is allowed to dry in air or in oven enviornment of about 160°F. The matrix product is now ready for the second heat treatment cycle, as will be presently described, to form a monolithic, fused product of glass-ceramic material.

The factors relating to composition of materials and heat treatment hereof in the embodiments set forth above will now be described.

HEAT TREATMENTS

I. The initial heat treatment already referred to herein as the first heat cycle may be carried out in a suitable refractory oven or kiln heated to temperatures controlled within the following schedule.

The assembly of thermally crystallizable glass tubing is heated at any suitable rate that will not thermally shock the tubing up to a temperature range in the maximum nucleating range of the glass. The maximum nucleation range can be determined for all such glasses by the general method outlined in U.S. Pat. No. 3,380,818 beginning at Column 9, line 54.

Where sealing is to be effected or initiated while nucleation is occurring, it is preferred (but may not be essential for such nucleation) that the assembly of tubes be heated in the range of from 50°F to 250°F above the annealing point for a period of 1 hour or more. This time may be extended to 10 to 20 hours, and even longer times are often not harmful. During this time of heating in such temperature range, nucleation is effected as well as fusion aided by the pressure exerted by expansion of the trapped fluid in the sealed end tubes. Thereafter, as is optional under the present invention, the temperature may be raised above the first heating range. A temperature that is at least 200°F above the annealing point temperature or even as high as the final crystallization temperature (usually 1800°–2300°F). The final crystallization of the glass-ceramic can be effected at any such temperature range higher than the nucleation-expansion-fusion temperature sequence, and can be as low as 200°F above the annealing point or as high as 2300°F or as high as the upper liquidus temperature.

Thus, in the treatment of the glass tubing in the first heat treat cycle, the nucleation-expansion-fusion should occur; however, the treatment may be continued, as in certain examples hereinafter, to form the final crystallized glass-ceramic product prior to the reinforcing of the matrix. This latter technique may not need the second heat treat cycle, now to be described, in examples wherein a solid state reaction product is used to fill or stuff some selected passages of the matrix.

II. The second heat treat cycle, when applied in the present invention, is performed after the opened passages are selectively stuffed or filled with the thermally crystallizable frit composition. The matrix and frit assembly is heated to 50° to 250° above the annealing point of the frit composition for a suitable period so that the frit is essentially crystallized to the stable phase for the material. The assembly is now heated up into the final crystallization heat treatment range; that is matrix and filling frit material are heated to 2100°F or higher at a controlled rate of about 100°F per hour. The product is held at the 2100°F or higher temperature for 6 hours or more and then cooled to ambient temperature at a controlled rate of about 100°F per hour.

In this second stage of heating, completion of crystallization is achieved to a degree such that the product, now integrally formed, has an average coefficient of expansion in the range set forth herein.

While the temperature may be raised directly to the final crystallization temperature range at a suitable furnace heating rate, usually in the range of 10° to 300°F per hour, it is usually preferred to allow crystallization to be effected slowly.

Thus, in either first or second heat treat cycle, where final crystallization is carried out, an intermediate step between the first cycle of the heat treatment and the final crystallization is desirable. The intermediate heat treatment range is usually about 200°F to about 700°F and usually from 200° to 500°F above the annealing point of the original glass. Exemplary holding times in this intermediate range are from 1 to 8 hours, after which the assembly is heated up to the final crystallization temperature, i.e., in the range of about 1800° to 2300°F.

Obviously, no specific heat treatment instructions can be given suitable for all thermally crystallizable glass compositions. As is known, glass-ceramics do not have adequate strength generally if they are not sufficiently nucleated before crystals are allowed to grow appreciably in size, so that routine experiments known to those skilled in the art are used to determine what length of time is best to obtain an adequate number of crystallization centers or nuclei in the glass in the nucleation temperature range of 50° to 250°F above the annealing point.

SLURRY COMPOSITION

A glass composition selected from those in the table below, may be ground to a finely divided powder of either a non-crystallized (green) glass or a crystallized glass-ceramic.

TABLE I

EXAMPLES OF SUITABLE FRIT COMPOSITIONS
WEIGHT PER CENT

|  | I | II | III |
|---|---|---|---|
| $SiO_2$ | 54.6 | 75.8 | 73.0 |
| $Al_2O_3$ | 25.5 | 16.8 | 17.65 |
| $B_2O_3$ | 2.2 | | |
| $Fe_2O_3$ | 0.03 | | |
| $TiO_2$ | 0.14 | 1.84 | 1.4 |
| $ZrO_2$ | 2.67 | 1.17 | 1.6 |
| PbO | 0.50 | | |
| CaO | 0.01 | | |
| MgO | 0.02 | | |
| ZnO | 0.04 | | 1.7 |
| $Na_2O$ | 0.9 | 0.55 | 0.1 |
| $K_2O$ | 4.10 | | |
| $Li_2O$ | 8.0 | 4.44 | 4.15 |
| $F_2$ | 0.13 | | |
| $Cl_2$ | | | 0.1 |
| $Sb_2O_3$ | | | 0.3 |

EXAMPLE I

The slurry is made from the green glass frit powder mixed with a vehicle consisting of amyl acetate with 1.2 nitrocellulose in a ratio of 2½ to 3 parts of frit powder (dry) to one part of the vehicle. The resulting slurry has a consistency about like a thin putty. The mixture has a viscosity of 17 ± poise converted from readingstaken on a McMichael rotating drum viscometer.

The slurry is pressure injected by the gun device into several of the passages of a matrix product in a manner as earlier described and that has received the first heat treatment and the opposite ends of the sealed tubes ground or cut away to open the matrix into a plurality of through passages. The injected slurry composition is next dried in place at room temperature or in an oven at up to 160°F for from 4–8 hours. The treated matrix product is then given the second heat treatment for final crystallization of the matrix and frit composition in the selected passages thereof. The composite is thus converted to an integral glass-ceramic structure having similar linear expansion properties.

EXAMPLE II

A green glass selected from a composition in Table I above is ground to −200 mesh powder form and mixed with a powdered alumina-silica product sold under the trade name QF-180, which is a product of Carborundum Company. The resulting slurry is about like thin putty in the form for application into the matrix passages. The matrix product is first heat treated, as in Example I, and the tube ends removed. The mentioned slurry is injected into the selected passages of the matrix and dried. The second heat treatment is given, as described in Example I.

EXAMPLE III

A powder of a glass composition given in Table I, above, is ground to −325 mesh and blended with vehicle of amyl acetate and 1.2 percent nitrocellulose in a ratio of about 2½ to 3 parts of powder to 1 part vehicle. This is processed into a matrix, the same as described in Example I.

EXAMPLE IV

A glass selected from a composition in Table I that is fully crystallized to a glass-ceramic and ground to a fine frit powder in the range of −200 to −325 mesh particle size. The frit powder is mixed with the alumina-silica compound, QF-180 and made as a slurry of the type described in Example II. The matrix product is given the first heat treat cycle and thereafter given final heat treatment to bring the glass to the nucleation-bloating-fussion stage and next to final crystallization stage as a glass-ceramic. The tube ends of the matrix are removed to open its several passages. Selected passages of the matrix are then stuffed with the slurry of this example and dried.

EXAMPLE V

A −200 mesh powder of a solid state reaction product of $Li_2O_3.Al_2O_3SiO_2$ is blended with vehicle and mixed to slurry state. The matrix is treated as in Example I through the first heat treat cycle and the passages opened by machining. The Si-Al-Li product is inserted into certain of the matrix passages. The composite is then given the second heat treat cycle whereupon an integral product is formed uniting the powder and the fully crystallized wall structure $22b$ of the glass-ceramic matrix passages.

EXAMPLE VI

A fully crystallized glass-ceramic made from one of the Table I glass compositions is finely divided as a powder, such as in Example IV, is mixed with a $Li_2O_3.Al_2O_3.SiO_2$ (solid state reaction product) and formed as a putty-like slurry. The matrix product is heat treated through the first and second cycles to fully crystallize the matrix to a glass-ceramic. The passages are then opened in the machining step. The slurry is inserted into selected opened passages of the matrix and dried. The composite is then ready for use in a heat exchanger.

MATRIX COMPOSITION

TABLE II

An exemplary of suitable matrix tube compositions, the closed-end, hollow tubes 22 may be made from the following compositions:

EXAMPLES OF SUITABLE MATRIX TUBE COMPOSITIONS

| INGREDIENT | WEIGHT PER CENT | | | |
|---|---|---|---|---|
| | I | II | III | IV |
| $SiO_2$ | 73.0 | 75.8 | 70.6 | 68.6 |
| $Al_2O_3$ | 17.65 | 16.8 | 19.7 | 21.3 |
| $Li_2O$ | 4.15 | 4.44 | 3.7 | 4.0 |
| ZnO | 1.7 | | 1.7 | |
| $TiO_2$ | 1.4 | 1.84 | 1.7 | 2.0 |
| $ZrO_2$ | 1.6 | 1.17 | 1.5 | 1.6 |
| $Na_2O$ | 0.1 | 0.55 | 0.4 | 0.4 |
| $Cl_2$ | 0.1 | | 0.1 | |
| $Sb_2O_3$ | 0.3 | | 0.5 | 0.3 |
| $K_2O$ | | | 0.2 | 0.2 |
| $F_2$ | | | 0.1 | |
| MgO | | | | 0.1 |

Well suited for use in this invention are thermally crystallizable glasses that are convertible by heating to glass-ceramic bodies. As used herein, a glass-ceramic is an inorganic, essentially crystalline oxide ceramic material derived from an amorphous inorganic glass by in situ bulk thermal crystallization.

Prior to thermal in situ bulk crystallization, the thermally crystallizable glasses can be drawn into tubing using conventional glass forming techniques and equipment. The tubing is on the order of 0.030 inch average outside diameter and 0.026 inch average inside diameter, the average wall thickness being 0.002 inch. The tubes are cut to desired length for the product made therefrom and sealed at the opposite ends. The cutting and end sealing may be accomplished in the same step.

As is taught in the aforementioned Gray application, Ser. No. 169,216, the end-closed tubes prior to assembly may be coated with a slurry of the finely divided frit powder composition. This provides for a more dense matrix wall structure after bloating enabling more readily the fusion of the walls of the tubes in their intersticial area in the bloating step, described herein.

After being assembled in the manner shown in FIG. 1 or described herein in connection with FIG. 8, the thermally crystallizable glass tubes are subjected to a controlled heat treatment in the first heat treat cycle (bloating) until the end-closed tubes have been expanded and fusion sealed.

Thermally crystallizable glass compositions and the glass-ceramics resulting from thermal in situ crystallization thereof which are useful in the method and product of this invention are those which have, in their crystallized state, a coefficient of thermal expansion in the range from −18 to +50 × $10^{-7}$/°C over the range 0°–300°C. The compositions usually used are those containing lithia, alumina and silica, together with one or more nucleating agents including $TiO_2$, $ZrO_2$, $SnO_2$, or other known nucleating agents. In general, such compositions containing in weight per cent about 64 to 79 $SiO_2$, about 13 to 25 $Al_2O_3$ and about 2 to 6 $Li_2O$, together with about 1.2 to 4 weight per cent of nucleating agents selected from one or more of $TiO_2$, $ZrO_2$ and $SnO_2$, can be employed. Preferrably, not more than about 2.5 weight per cent $TiO_2$ is usually used or the crystallization is undesirably rapid to be compatible with the fullest expansion of the tubes in the bloating process. Other ingredients can be present in small amounts, as is understood in the art, such as even as much as four or five weight per cent ZnO, up to as much as three or four weight per cent CaO, up to as much as eight per cent MgO, and up to as much as five per cent BaO, so long as the silica plus alumina plus lithia and the nucleating agent(s) are at least about 85 (usually 90) weight per cent of the total glass and the glass composition will thermally crystallize to a glass-ceramic having the desired low expansion of −18 to +50 × $10^{-7}/°C$.

For the process of the present invention, bloating is effected upon heating the assembled tubes in the range 50° to 250° above the annealing point of the glass for a suitable period. During this time of heating in such temperature range, fusion of the tube walls and stuffing compound is aided by pressure exerted by expansion of the entrapped fluid. During this heat treatment, the material is essentially crystallized to the stable phase for the material. As in one of the Examples of the invention earlier stated herein, the assembly is thereafter cooled to about room temperature and the machining performed, as earlier described, to open the opposite ends of the previously closed-end tubes. The selected tube passages are next filled with the composition of the finely ground frit powder in paste or slurry form and dried at temperature of 70° to 160°F for from 4–8 hours. The assembly is now ready for final heat treatment in which the bloated matrix and frit filling certain areas of the matrix are converted to a glass-ceramic material.

It is preferred to use a frit composition which is substantially the same as the composition of the glass tubing to obtain substantially the same coefficient of lineal expansion of the glass-ceramic matrix. However, in some applications it may be desirable to blend compositions of the frit and matrix tubes to achieve a difference in lineal expansion, and thus achieve another effect in the final product. Such is available within the teaching of the present invention and should be readily apparent to those skilled in this art.

Other techniques may be employed in introducing the frit powder composition into the passages of the bloated matrix. For example, dry powders may be used and a form of entrainment and tamping technique used to stuff the material to proper density into the matrix passages where reinforcing is selected in the structure of the matrix product. Or, the material may be squeegie applied by repetitive passes.

It should also be mentioned that ordinary sinterable ceramic powders or air setting cements having a very low expansion may be useful for certain paste or slurry applications. These powders will sinter or adhere together and to the walls of the passages of the matrix where filled creating a fusion chemical bond between the particles and the passage walls. The resultant thermal expansion and chemical characteristics should be substantially compatible with the glass matrix composition.

For many applications, particularly when the matrix product is used as a heat exchanger in the fields discussed herein, a low expansion and heat/thermal shock resistant matrix is required. For example, when used as a regenerator in a gas turbine engine, hot gas from the turbine can be passed through a rotating matrix in one direction and in one segment thereof, while cold incoming air is at the same time passed through the matrix in the other segment thereof, picking up heat from the previously heated matrix passageways.

Therefore, a preferred embodiment of this invention utilizes thermally crystallizable glass compositions for the tubes which in their crystallized state, 1. have essentially zero porosity,
2. consist essentially of an inorganic crystalline oxide ceramic material,
3. have an average coefficient of lineal thermal expansion of about −12 to +12 × $10^{-7}/°C$ in a range 0°–300°C, and preferably a coefficient of about −5 to +5 × $10^{-7}/°C$ in a range 0°–300°C and
4. a thermal conductivity of less than 0.01 cal/cm/sec/cm²/°C at 400°C.

When the matrix tubes have such a coefficient of expansion it is preferred, also, that the expansion coefficient of the slurry-frit material also be in the −12 to +12 (preferably −5 to +5) × $10^{-7}/°C$ range over the temperature range 0°–300°C.

It should be noted that the selected areas of matrix stuffed and reinforced in accordance with this invention also produce a face thereon capable of increased wear-resistance. For instance, in the gas turbine regenerator embodiment herein described, the open-ended faces of the rotary element of the regenerator is in moving friction contact with a seal bar (not shown). This structure is well-known in separating the gas streams of the hot exhaust gas and the cold incoming air in the regenerator. The filled, reinforced regions at the hub and perimeter of the regenerator wheel matrix, since they are sintered to a monolithic structure, will enhance their wear resistance in relation to the seal bar movement in its contact over those surface areas.

There is shown and described herein the various fundamental novel features of the invention with reference to the preferred embodiments; and those skilled in the art will recognize that various changes, substitutions and modifications in the methods and structures described may be resorted to without departing from the spirit of the invention.

It is claimed:

1. A structurally reinforced, integral and monolithic glass ceramic counter-cross-flow recuperator matrix comprised of a thermally crystallized glass material defining a plurality of passageways through the monolithic structure of said recuperator matrix, said plurality of passageways being disposed in separate, plural, substantially parallel planes, the passageways in each plane being parallel to each other, some of said passageways being adapted to convey a first fluid medium through the recuperator matrix in heat exchange relationship to a second fluid medium being conveyed through other of said passageways of the recuperator matrix, and a sintered and fused thermally crystallized glass-ceramic frit material filling preselected ones of said passageways thereof:
   1. in regions at the sides of each plane of the recuperator matrix, wherein said frit material is fused with the material of the recuperator matrix wall defining said preselected passageways and completely closing said passageways, thereby structuraly reinforcing opposite facings of the recuperator matrix in a perimeter region, and 2. in alternate planes of the passageways which open on opposite faces of the matrix, a central region of such passageways wherein said frit material is fused with the material of the matrix wall defining such passageways and completely filling and closing said passageways, thereby forming an interior wall-like structure in said planes dividing said matrix into counter flow segments, the cross flow segment of the recuperator comprising the parallel passageways in the planes between said alternate planes.

2. A structurally reinforced, integral and monolithic glass-ceramic counter-crossflow recuperator matrix comprised of a thermally crystallized glass material defining a plurality of passageways through the monolithic structure of said recuperator matrix, said plurality of passageways being disposed in separate, plural substantially parallel planes, the passageways in each plane being parallel to each other, some of said passageways being adapted to convey a first fluid medium through the recuperator matrix in heat exchange relationship to a second fluid medium being conveyed through other of said passageways of the recuperator matrix, and a sintered and fused thermally crystallized glass-ceramic frit material filling preselected ones of said passageways throughout their length in a central region of alternate planes of the passageways which open on opposite faces of the matrix containing said frit material fused therein longitudinally throughout the length of such passageways with the material of the recuperator matrix and completely filling and closing said passageways thereby forming in said central region an interior wall-like structure in said alternate planes dividing said matrix into counter flow segments, the cross flow segment of the recuperator matrix comprising the parallel passageways in the planes between said alternate planes.

* * * * *